Sept. 4, 1956
S. D. BRADLEY
2,761,536
GLASS WEATHER STRIP
Filed Nov. 28, 1951
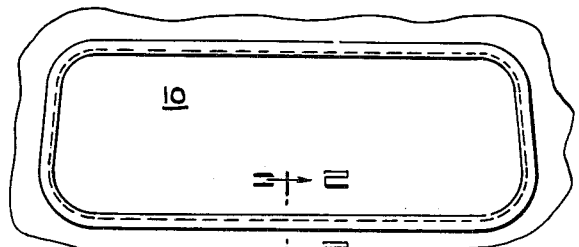
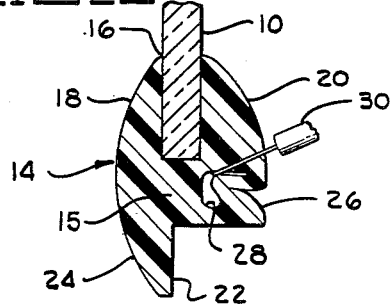
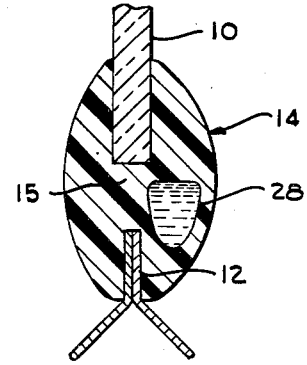
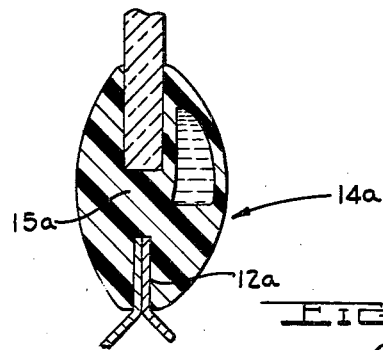
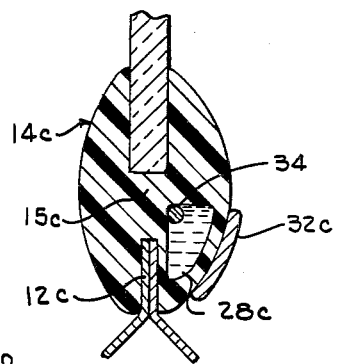
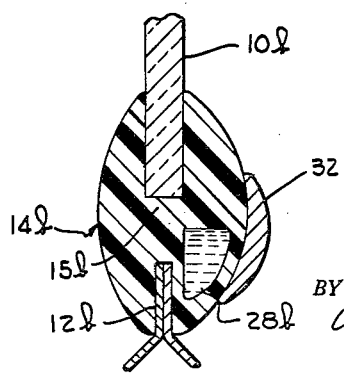
INVENTOR.
STEPHEN D. BRADLEY
BY
ATTORNEY

United States Patent Office 2,761,536
Patented Sept. 4, 1956

2,761,536

GLASS WEATHER STRIP

Stephen D. Bradley, Detroit, Mich., assignor to Detroit Macoid Corporation, Detroit, Mich., a corporation of Michigan Application November 28, 1951, Serial No. 258,601

3 Claims. (Cl. 189—78)

The present invention relates to improvements in a weather strip adapted for joining the aligned contiguous edges of spaced panels, and to the novel method for assembling the weather strip in position to seal and cushion such panels. The present invention is particularly useful in mounting window panels in the window openings of vehicle bodies and the like.

In providing a window in a vehicle body, it is customary to form a window opening within the body and place a resilient strip around said opening to seat the window panel. Vehicle body manufacturers have sought an effective and economical weather strip which would efficiently mount a window panel in the window opening of a vehicle body and which would compensate for the allowed tolerances while providing an attractive ornamental appearance for the joint between the window opening and the glass panel.

Among other constructions which have been used in the past is a construction including a strip of resilient material which is substantially H-shaped in cross section and which is provided with an outwardly opening transverse groove adjacent the cross bar in the H. In this construction, a wedge is forced into the groove to increase the pressure between the resilient material and the adjacent portions of the window panel and the frame surrounding the window opening in the vehicle body which are thus joined in edge-to-edge relation. In assembling the window panel in the window opening of the vehicle body, the H-shaped strip must be first aligned with the edges of the window panel and the window opening and temporarily held in place while the wedge-shaped strip is inserted manually by the use of a special tool. In addition to being a relatively costly operation, variations in sizes in commercial runs of the wedge strips and the H-shaped body strips make it difficult to assure a definite seal at all times. If, for example, the groove in the H-shaped strip should be slightly undersize, the seal will not be effective and will leak. If the wedge becomes loose in the H-shaped strip after the construction has been in use for a period of time and has been subjected to vibrations and adverse weather conditions, the seal will also leak. In addition, such constructions require highly resilient materials which usually are of drab colors and, thus, it is necessary to provide an ornamental trim around the weather seal to mask its appearance. This also adds to the cost of the weather seal.

Therefore, it is a principal object of the present invention to provide a weather strip adapted to join the aligned contiguous edges of a pair of spaced members, the weather strip comprising a single flexible body which will firmly seat the said members in position and provide a weather-tight seal therebetween.

It is a further object to provide such a weather strip having oppositely extending upper and lower channels therein, a longitudinally extending closed pocket, and a pressure-exerting material disposed in said pocket after the strip is in place between the joined members to exert a pressure on the channel sides to firmly hold the members in place and to provide a weather-tight leakproof seal between the edges of the joined members.

It is a further object of the present invention to provide a novel method for affixing such a weather strip in the assembled position, which facilitates the positioning of the edges of the members within the channels of the weather strip and which includes injecting a material in a fluid state under pressure into the closed pocket to effect a tight engagement of the edges of the members within the weather strip channels.

It is another object of the present invention to provide a weather seal which can be formed of flexible thermoplastic materials which are available in a wide range of colors, the resultant weather seal being attractive in appearance, and thus, eliminating the necessity for using a separate trim molding to mask its appearance.

It is another object of the present invention to provide a method for affixing a thermoplastic weather strip to the edges of joined members of different thicknesses and different materials, wherein the thermoplastic weather strip may be heated and subjected to pressures during assembly with the members so that the irregularities in the weather strip and members are compensated and a weather-tight connection is effected.

Other objects of this invention will appear in the following description and appended claims, reference being had to the accompanying drawings forming a part of this specification wherein like reference characters designate corresponding parts in the several views.

In the drawings:

Fig. 1 is an elevation of a window panel of the type which is mounted in a window opening in a vehicle body;

Fig. 2 is a sectional elevation taken along the line 2—2 in the direction of the arrows, Fig. 1;

Fig. 3 is a section similar to Fig. 2 and showing the window panel in position in the weather strip, the lower channel being opened to receive the edge flange of the window opening in the vehicle body;

Fig. 4 is a sectional elevation showing another embodiment of the weather strip of the present invention, wherein the weather strip pocket is disposed adjacent the window-receiving channel;

Fig. 5 is a sectional view of a thermoplastic weather strip embodying the present invention in assembled position and showing an electrode disposed on the weather strip for heating the same; and Fig. 6 is a sectional view similar to Fig. 5 except that an internal wire is shown disposed in the weather strip pocket, which wire is adapted to produce heat in the thermoplastic weather strip body by receiving a high frequency flux from the electrode.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A preferred embodiment of the present invention includes a continuous resilient body which is H-shaped in cross section and which has a longitudinally extending closed pocket therein. This body is designed to accommodate the minimum allowed tolerances between the connected parts. The body member has two parallel legs and a cross bar which form oppositely disposed channels, one above and one below the cross bar. One of two panels adapted to be disposed in edge-to-edge relation is placed in one of the channels. The pocket is then collapsed by applying suction thereto to reduce the pressure therein and this action displaces one of the channel sides of the free channel thereby facilitating insertion of the second panel. The second panel is disposed in position, and then the pocket is filled with a pressure exerting material in a fluid, forcing the displaced side of the channel back in position under pressure. The amount of fluid is controlled to enlarge the body as required to compensate for the tolerances between the connected panels. The pressure exerted by the fluid in the pocket is distributed throughout the sealing strip and provides a weather-tight seal between the weather strip and the connected panels.

Referring to Figs. 1–3 of the drawings, a transparent window panel is indicated at 10, the mounting flange of a window opening in a vehicle body is indicated at 12, and a flexible weather strip is indicated at 14. The weather strip 14 comprises a continuous flexible body 15 which is preferably resilient and H-shaped in cross section, thus providing an inner channel 16 bounded by the side lips 18 and 20 and an outer channel 22 bounded by the side lips 24 and 26. A longitudinally extending closed pocket 28 is provided in the weather strip body 14.

The embodiments of the invention shown in Figs. 2, 3, 5 and 6 show the pocket disposed adjacent the outer channel, and the construction shown in Fig. 4 discloses the pocket located adjacent the inner channel. Either of these constructions is satisfactory. The former construction is adapted for an assembly wherein the window is inserted first, and the latter construction is adapted for an assembly wherein the body flange is inserted first.

Figs. 2 and 3 of the drawings demonstrate the novel method of affixing the weather strip to the aligned window 10 and body flange 12. The window panel 10 is inserted into the inner channel 16. Suitable means, such as the needle 30, is then inserted into the pocket 28 and a suction is applied thereto, thus collapsing the pocket 28 and pulling the side lip 26 away from the lower channel 22. At this point in the assembly procedure, the window panel and the connected weather strip may be readily inserted in the window opening and the strip placed in position to grip the flange 12 of the body opening between the side lips 24 and 26. Another needle is then inserted through the resilient body 15 into the pocket 28 and a material in fluid state is supplied into the pocket. The fluid so inserted is under such pressure as required to cause the fluid to fill the pocket which in turn causes side lip 26 to return to its initial position. The fluid exerts a pressure between the weather strip body 15 and the window 10 and between the weather strip body 15 and the flange 12. The punctures in the weather strip body 15 caused by the needles will quickly and readily seal, due to the nature of the resilient material of which the weather strip 14 is formed.

Of course, the panel 10 and flange 12 can be placed within the channels 16 and 18 without collapsing the pocket 28 to move the lip 26 out of position, and then the pocket 28 can be filled as described above. However, it is preferred to collapse the pocket and follow the procedure outlined previously, since this greatly facilitates assembly.

One type of material used for insertion into the pocket 28 is any one of the hydrocarbons, such as gasoline, turpentine, kerosense or oil, which remain fluid and which have a solvent action on the resilient weather strip material surrounding the pocket 28, thus swelling the inside of the pocket and exerting pressure on the side lip 26 to improve the sealing action. Of course, any type of material which has this solvent action is suitable for use in the pocket 28.

Another type of material which can be used to insert into the pocket 28 when the weather strip body 15 is formed of a thermoplastic material is a mixture of a catalyst and a monomeric type resin which, after a period of time, will polymerize and expand to form either a rigid or flexible solid mass. Examples of this type of material are the paraplexes as manufactured by Resinous Products Division of Rohm & Haas. This polymerization process produces heat which softens the thermoplastic material of the weather strip allowing it to flow into all the irregularities of the glass and metal surfaces to form a more perfect seal.

Another type of material which can be used is a plastisol or organosol which, by the application of heat, will form a solid mass. The application of heat will not only solidify the material, but will also cause the weather strip material to flow into any irregularities and, thus, form a more effective weather seal.

Fig. 5 of the drawings demonstrates the method of applying the thermoplastic weather strip $14^b$ to the window $10^b$ and body flange $12^b$ which involves the use of an electrical source to produce the heat. In this method, the body of the vehicle is made one electrode by attaching it to one pole of a very high frequency unit (not shown), and a separate electrode 32 is applied to the surface of the weather strip $14^b$ and connected to the other pole of the very high frequency unit. This method utilizes the high resistance of the weather strip body $15^b$ and the substance in the pocket $28^b$ to give resistance heating to the weather strip $14^b$, thus effecting flow of the weather strip material around the metal and glass surfaces.

A related embodiment of this method is shown in Fig. 6 of the drawings wherein a complete loop of conductive metal wire 34 is disposed within the pocket $28^c$. The electrode $32^c$ is applied to the surface of the weather strip body $15^c$ and the wire loop 34 is heated by the application of high frequency flux from the electrode $32^c$. This method is suitable when the plastisol or organosol is used as explained above. The wire 34 also acts as a reinforcement for the weather strip $14^c$ and facilitates assembly by holding the weather strip in shape.

The above methods are adapted for use with any suitable type of flexible material such as rubber or elastomeric plastics. By using material, such as extruded polyvinyl plastics, the weather strip can be provided in any desired color including a metallic color, thus, giving the weather strip a pleasing appearance without the necessity of providing trim moldings.

Although the present invention is the solution to a very prominent problem in the motor vehicle field, it is readily apparent that the construction and method are not limited in use to automobiles, trucks and the like, but may also well be used in train cars, trailers, housing constructions, and any other construction wherein it is desired to join spaced members in edge-to-edge relation.

Having thus described my invention, I claim:

1. In combination, a pair of spaced members disposed in edge-to-edge relation, a flexible mounting strip comprising a body having channels formed therein, each channel seating one of said spaced members, said body also having a longitudinally extending closed pocket therein, and a separate highly incompressible expanded pressure-applying material disposed in said pocket to firmly embrace said members within said mounting strip.

2. The method of joining adjacent edges of spaced panels at least one of which is metallic with a flexible thermoplastic weather strip having an outer channel and an inner channel formed therein with a closed pocket adjacent one side of one of said channels, comprising the steps of inserting the edge of one of said panels into the channel furthest from said pocket, collapsing said pocket by reducing the pressure therein so that one side of the adjacent channel is displaced and the channel is opened, placing the other of said panels with said opened channel, thereafter filling said pocket with a highly incompressible expansible material in fluid state so that the sides of said channels are tightly closed about the edges of the panels contained therein, and heating the thermoplastic weather strip material by attaching one pole of a very high frequency unit to the metallic panel and placing an electrode connected to the other pole of the very high frequency unit to the surface of the weather strip, and thereafter passing a very high frequency flux between said electrode and said metal panel, the heated thermoplastic material thus flowing into irregularities in the said panels to form a tight seal.

3. A connecting strip of the class described including a strip of flexible material having a longitudinal channel therein to engage the edge of a part to be connected and a longitudinally extending closed pocket adjacent said channel adapted to receive a pressure exerting material when the weather strip is in place, and a continuous loop of relatively stiff highly conductive wire disposed within the pocket of said connecting strip against the side wall thereof to reinforce said connecting strip and maintain it in its desired shape, said wire being adapted to receive a high frequency flux for heating the connecting strip material during assembly.

References Cited in the file of this patent
UNITED STATES PATENTS

| | | |
|---|---|---|
| 2,093,092 | McElhany | Sept. 14, 1937 |
| 2,184,534 | Smith | Dec. 26, 1939 |
| 2,189,138 | Eichner | Feb. 6, 1940 |
| 2,219,576 | Moreland | Oct. 29, 1940 |
| 2,378,801 | Sidell | June 19, 1945 |
| 2,430,873 | Haas | Nov. 18, 1947 |
| 2,538,406 | Allen | Jan. 16, 1951 |
| 2,571,259 | Kusiak | Oct. 16, 1951 |
| 2,642,090 | Barr | June 16, 1953 |